(12) United States Patent
Tomihisa et al.

(10) Patent No.: US 6,498,231 B2
(45) Date of Patent: Dec. 24, 2002

(54) VINYLPYRROLIDONE POLYMER AND ITS STABILIZATION AND PRESERVATION PROCESSES

(75) Inventors: Daijo Tomihisa, Moriguchi (JP); Toshiaki Kuriyama, Suita (JP); Tomiyasu Ueta, Suita (JP); Akio Naka, Suita (JP); Hideyuki Nishibayashi, Kobe (JP); Yoshitomo Nakata, Nishinomiya (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/998,665

(22) Filed: Dec. 3, 2001

(65) Prior Publication Data

US 2002/0058782 A1 May 16, 2002

Related U.S. Application Data

(62) Division of application No. 09/544,631, filed on Apr. 6, 2000.

(30) Foreign Application Priority Data

Apr. 22, 1999 (JP) ............................................. 11-115150
Oct. 27, 1999 (JP) ............................................. 11-305580
Mar. 27, 2000 (JP) ..................................... 2000-087448

(51) Int. Cl.$^7$ ................................................. C08F 6/00
(52) U.S. Cl. ...................................................... 528/501
(58) Field of Search ......................................... 528/501

(56) References Cited

U.S. PATENT DOCUMENTS

| | | | |
|---|---|---|---|
| 3,235,523 A | | 2/1966 | Schurz et al. ............... 260/29.6 |
| 5,063,263 A | * | 11/1991 | Hayes et al. ................. 524/101 |

FOREIGN PATENT DOCUMENTS

| | | |
|---|---|---|
| EP | 0506192 | 9/1992 |
| JP | 61233027 | 10/1986 |
| JP | 01210463 | 8/1989 |
| JP | 05125353 | 5/1993 |
| JP | 06080818 | 3/1994 |
| JP | 09157479 | 6/1997 |
| JP | 11181298 | 7/1999 |

* cited by examiner

Primary Examiner—Terressa M. Boykin
(74) Attorney, Agent, or Firm—Roylance, Abrams, Berdo & Goodman, L.L.P.

(57) ABSTRACT

The present invention provides: a vinylpyrrolidone polymer which exhibits good heat resistance and storage stability; a composition containing the vinylpyrrolidone polymer; a stabilization process for the vinylpyrrolidone polymer, and a preservation process for a vinylpyrrolidone polymer by which: even when the vinylpyrrolidone polymer is preserved for a long time or at high temperature, the physical properties such as molecular weight (K value) of the vinylpyrrolidone polymer can be prevented from changing, therefore the vinylpyrrolidone polymer can stably be preserved. To enhance the heat resistance and the storage stability, a vinylpyrrolidone polymer is mixed with a certain amount of antioxidant, and the oxygen concentration is suppressed to not higher than 50,000 ppm in a gas phase that contacts with the vinylpyrrolidone polymer when preserving.

15 Claims, No Drawings

VINYLPYRROLIDONE POLYMER AND ITS STABILIZATION AND PRESERVATION PROCESSES

This application is a divisional application of Ser. No. 09/544,631, filed Apr. 6, 2000.

BACKGROUND OF THE INVENTION

A. Technical Field

The present invention relates to: a vinylpyrrolidone polymer which is excellent in the storage stability; a composition containing the vinylpyrrolidone polymer; a stabilization process for the vinylpyrrolidone polymer; and a preservation process for the vinylpyrrolidone polymer.

B. Background Art

A vinylpyrrolidone polymer, such as poly(vinylpyrrolidone) or a vinylpyrrolidone copolymer, is widely used in various fields such as medicines, cosmetics, pressure sensitive adhesives or adhesives, paints, dispersants, inks, and electronic parts, because the vinylpyrrolidone polymer has merits or advantages of biocompatibility, safety, hydrophilicity, and so on.

However, while providing the vinylpyrrolidone polymer to the above various uses, the present applicant found that the vinylpyrrolidone polymer had problems in respect to the stability of storability and so on. For example, whether the vinylpyrrolidone polymer is a powder or solution, there were cases where the vinylpyirolidone polymer or a solution thereof got colored or underwent the reduction of the molecular weight or viscosity when stored for a long time or at high temperature.

SUMMARY OF THE INVENTION

A. Object of the Invention

An object of the present invention is to provide: a vinylpyrrolidone polymer which has extremely good storage stability and thermal stability in that even if the vinylpyrrolidone polymer is stored for a long time, coloring or other changes of physical properties occur little, and the thermal stability is also excellent, and the storage in a solution state is also possible; a composition containing the vinylpyrrolidone polymer; and a stabilization process for the vinylpyrrolidone polymer.

Another object of the present invention is to provide a preservation process for a vinylpyrrolidone polymer by which: even when the vinylpyrrolidone polymer is preserved for a long time or at high temperature, the physical properties such as molecular weight (K value) of the vinylpyrrolidone polymer can be prevented from changing, therefore the vinylpyrrolidone polymer can stably be preserved.

B. Disclosure of the Invention

The present inventor diligently studied to solve the above problems. As a result, the inventor found that the above problems could be solved if the vinylpyrrolidone polymer was mixed with a certain amount of antioxidant, and further that a process, comprising the step of examining how much a K value, as defined by Fikentscher's equation, reduced when heating the vinylpyrrolidone polymer under prescribed conditions, was good as a process for exactly judging the storage stability of the vinylpyrrolidone polymer. The inventor also found that the above problems could be solved if the oxygen concentration in a gas phase that contacts with the vinylpyrrolidone polymer was kept to a certain amount or less when preserving. The present invention has been completed on the basis of these findings.

Therefore, a vinylpyrrolidone polymer, according to the present invention, contains at least one antioxidant in a ratio of 0.00001~30 weight %, preferably 0.001~30 weight %, to the vinylpyrrolidone polymer. Another vinylpyrrolidone polymer, according to the present invention, is adjusted such that the reduction ratio of the K value defined by Fikentscher's equation will be within 5% when the vinylpyrrolidone polymer is subjected to a forcible test in which the vinylpyrrolidone polymer is kept heated at 120° C. under normal pressure in air for 2 hours. Yet another vinylpyrrolidone polymer, according to the present invention, is adjusted such that the reduction ratio of the K value defined by Fikentscher's equation will be within 5% when the vinylpyrrolidone polymer is subjected to a promotion test in which the vinylpyrrolidone polymer is kept heated at 50° C. in a solution state for 14 days.

A composition for various uses, according to the present invention, comprises a vinylpyrrolidone polymer as a resin component, and further comprises at least one antioxidant in a ratio of 0.00001~30 weight %, preferably 0.001~30 weight %, to the vinylpyrrolidone polymer.

A stabilization process for a vinylpyrrolidone polymer, according to the present invention, comprises the step of mixing the vinylpyrrolidone polymer with at least one antioxidant in a ratio of 0.00001~30 weight %, preferably 0.001~30 weight %, to the vinylpyrrolidone polymer.

A preservation process for a vinylpyrrolidone polymer, according to the present invention, comprises the step of suppressing the oxygen concentration to not higher than 50,000 ppm in a gas phase that contacts with the vinylpyrrolidone polymer.

These and other objects and the advantages of the present invention will be more fully apparent from the following detailed disclosure.

DETAILED DESCRIPTION OF THE INVENTION

Hereinafter, a detailed description is given about a mode for carrying out the present invention.

The vinylpyrrolidone polymer in the present invention is, specifically, poly(vinylpyrrolidone) and/or a vinylpyrrolidone copolymer.

The poly(vinylpyrrolidone) is a compound of general formula (3) below:

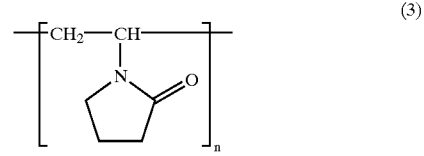

(wherein n is an integer) and is obtained by polymerizing vinylpyrrolidone by any method as mentioned below.

The vinylpyrrolidone copolymer is a copolymer of which the constituents include vinylpyrrolidone and a comonomer copolymerizable therewith. The comonomer to be copolymerized with vinylpyrrolidone is not especially limited, but specific examples thereof include: 1) (meth)acrylate esters such as methyl(meth)acrylate, ethyl(meth)acrylate, butyl(meth)acrylate, cyclohexyl(meth)acrylate, and hydroxyethyl (meth)acrylate; 2) (meth)acrylamide and derivatives therefrom such as N-monomethyl(meth)acrylamide, N-monoethyl(meth)acrylamide, and N,N-dimethyl(meth)acrylamide; 3) basic unsaturated monomers such as dimethylaminoethyl(meth)acrylate, dimethylaminoethyl (meth)acrylamide, vinylpyridine, and vinylimidazole and their salts or quaternized products; 4) vinylamides such as vinylformamide, vinylacetamide, and vinyloxazolidone; 5) carboxyl-group-containing unsaturated monomers such as (meth)acrylic acid, itaconic acid, maleic acid, and fumaric acid; 6) unsaturated anhydrides such as maleic anhydride and itaconic anhydride; 7) vinyl esters such as vinyl acetate and vinyl propionate; 8) vinylethylene carbonate and derivatives therefrom; 9) styrene and derivatives therefrom; 10) 2-sulfoethyl(meth)acrylate and derivatives therefrom; 11) vinylsulfonic acid and derivatives therefrom; 12) vinyl ethers such as methyl vinyl ether, ethyl vinyl ether, and butyl vinyl ether; and 13) olefins such as ethylene, propylene, octene, and butadiene. Among these groups of comonomers, particularly, groups 1)~8) are favorable, for example, in respect to the copolymerizability with vinylpyrrolidone. As to the above comonomers, only one kind may be copolymerized with vinylpyrrolidone, or any mixture of two or more kinds of comonomers may be copolymerized with vinylpyrrolidone.

The ratio of vinylpyrrolidone to the entire monomer components of the vinylpyrrolidone copolymer is not especially limited, but is preferably not lower than 0.1 mol %, more preferably not lower than 1.0 mol %, still more preferably not lower than 5.0 mol %, most preferably not lower than 20.0 mol %. In the case where the ratio of vinylpyrrolidone in the copolymer is lower than 0.1 mol %, there are disadvantages in that various properties deriving from vinylpyrrolidone cannot be exhibited and the deterioration of the polymer to be solved by the present invention is seen little.

The polymerization reaction to give the vinylpyrrolidone polymer can be carried out by conventional polymerization methods such as bulk polymerization, solution polymerization, emulsion polymerization, suspension polymerization, and precipitation polymerization. The reaction temperature in the polymerization reaction may fitly be set according to conditions such as reactants, but is preferably in the range of 0~250° C., more preferably 20~150° C., most preferably 40~100° C.

The polymerization reaction to give the vinylpyrrolidone polymer may be carried out by adding conventional polymerization initiators, of which the specific examples include: radical polymerization initiators such as azo compounds (e.g. 2,2'-azobisisobutyronitrile and 2,2'-azobis(2-methylpropionamidine)dihydrochloride) and peroxides (e.g. benzoyl peroxide and hydrogen peroxide); and cationic polymerization initiators such as boron trifluoride or complexes thereof, iron(II) chloride, diethylaluminum chloride, diethylzinc, heteropolyacids, and activated clay. The concentration of the polymerization initiator in the polymerization reaction is not especially limited, but is preferably in the range of 0.001~10 weight %, more preferably 0.01~5 weight %, most preferably 0.05~3 weight %, of the monomer components. When the polymerization reaction is carried out, for example, any chain transfer agent, pH-adjusting agent, or buffer agent may fitly be used besides the polymerization initiator as the need arises.

The solvent, as used for the polymerization reaction to give the vinylpyrrolidone polymer, or as used when preserving the vinylpyrrolidone polymer in a solution state, is not especially limited, but examples thereof include: water; alcohols such as methyl alcohol, ethyl alcohol, isopropyl alcohol, diethylene glycol; alkylene glycol ethers (acetates) such as propylene glycol monomethyl acetate and diethylene glycol monomethyl ether acetate; amides such as dimethylformamide and N-methylpyrrolidone; esters such as ethyl acetate, butyl acetate, and γ-butyrolactone; aliphatic hydrocarbons such as hexane and octane; alicyclic saturated hydrocarbons such as cyclohexane; alicyclic unsaturated hydrocarbons such as cyclohexene; aromatic hydrocarbons such as benzene, toluene, and xylene; ketones such as acetone and methyl ethyl ketone; halogenated hydrocarbons such as dichloroethane, chloroform, and carbon tetrachloride; ethers such as diethyl ether, dioxane, and tetrahydrofuran; sulfonate esters such as dimethyl sulfoxide; carbonate esters such as dimethyl carbonate and diethyl carbonate; and alicyclic carbonate esters such as ethylene carbonate and propylene carbonate. Among these, particularly, the ethers (acetates) and the amides are preferable, and water and the alcohols are more preferable. These solvents may be used alone respectively or in combinations with each other. In addition, the above solvents are preferably used such that the concentration of the monomer components in the raw material mixture in the polymerization reaction can be preferably in the range of 1~99 weight %, more preferably 5~70 weight %, most preferably 10~60 weight %.

In the present invention, the stabilization of the properties, such as storability and heat resistance, of the vinylpyrrolidone polymer is designed by mixing the above vinylpyrrolidone polymer with at least one antioxidant in a ratio of 0.00001~30 weight %, preferably 0.001~30 weight %, to the vinylpyrrolidone polymer. In the case where the mixing ratio of the antioxidant is lower than 0.00001 weight %, the stabilization of the properties such as storability and heat resistance is difficult. In the case where the ratio is higher than 30 weight %, there are problems in that the inherent properties, such as strength and appearance, of the polymer are damaged.

Examples of the antioxidant usable in the present invention include:

phenolic antioxidants such as sodium salicylate, potassium salt of methylbenzotriazole, 2-mercaptobenzimidazole, 2,4-dihydroxybenzophenone, 2,6-di-t-butyl-p-cresol, butylated hydroxyanisole, 2,6-di-t-butyl-4-methylphenol, 2,6-di-t-butyl-4-ethylphenol, stearyl-β-(3,5-di-t-butyl-4-hydroxyphenyl)propionate, propyl 3,4,5-trihydroxybenzoate, hydroquinone, and catechol;

bisphenolic antioxidants such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), 3,9-bis[1,1-dimethyl-2-[β-(3-t-butyl-4-hydroxy-5-methylphenyl)propionyloxy]ethyl]2,4,8,10-tetraoxaspyrro[5,5]undecane, and 4,4'-(2,3-dimethyltetramethylene)dipyrrocatechol;

high-molecular phenolic antioxidants such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis-(4'-hydroxy-3'-t-butylphenyl)butyric acid]glycol ester, 1,3,5-tris(3',5'-di-t-butyl-4'-hydroxybenzyl)-s-triazine-2,4,6-(1H,3H,5H)trione, and tocopherol;

sulfur-containing antioxidants such as dilauryl 3,3'-thiodipropionate, dimyristyl 3,3'-thiodipropionate, distearyl 3,3'-thiodipropionate, 2-mercaptobenzimidazole, tetrakismethylene-3-(laurylthio)propionatemethane, and stearylthiopropylamide;

phosphorus-containing antioxidants such as triphenyl phosphite, diphenylisodecyl phosphite, phenyldiisodecyl phosphite, 4,4'-butylidene-bis(3-methyl-6-t-butylphenylditridecyl)phosphite, cyclic neopentanetetraylbis(octadecyl)phosphite, tris(nonylphenyl)phosphite, tris(mono- and/or dinonylphenyl)phosphite, diisodecylpentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl)phosphite, cyclic neopentanetetraylbis(2,4-di-t-butylphenyl)phosphite, cyclic neopentanetetraylbis(2,6-di-t-butyl-4-methylphenyl)phosphite, 2,2-methylenebis(4,6-di-t-butylphenyl)octyl phosphite, distearylpentaerythritol diphophite, di(2,4-di-t-butylphenyl)phophite, and tetrakis(2,4-di-t-butylphenyl)-4,4-biphenylene phophonite;

alcoholic antioxidants such as erysorbic acid, sodium erysorbate, and isopropyl citrate;

amine antioxidants such as methylated diphenylamine, ethylated diphenylamine, butylated diphenylamine, octylated diphenylamine, laurylated diphenylamine, N,N'-di-sec-butyl-p-phenylenediamine, and N,N'-diphenyl-p-phenylenediamine;

hindered-amine antioxidants such as 4-benzoyloxy-2,2,6,6-tetramethylpiperidine, bis(2,2,6,6-tetramethyl-4-piperidinyl)sebacate, bis(1-octyloxy-2,2,6,6-tetramethyl-4-piperidinyl)sebacate, bis(1,2,2,6,6-pentamethyl-4-piperidinyl)sebacate, dimethyl succinate-1-(2-hydroxyethyl)4-hydroxy-2,2,6,6-tetramethylpiperidine and condensed products thereof, and 8-acetyl-3-dodecyl-7,7,9,9-tetramethyl-1,3,8-triazaspyrro[4,5]decane-2,4-dione. These may be used alone respectively or in combinations with each other.

Among the above-exemplified antioxidants, particularly, compounds having a phenolic hydroxyl group are preferably used in the present invention, of which the specific examples include the phenolic antioxidants, the bisphenolic antioxidants, and the high-molecular phenolic antioxidants. If the compound having a phenolic hydroxyl group is used as the antioxidant, there are advantages of not increasing the ash content resultant from strong heating of the vinylpyrrolidone polymer.

As to the antioxidant, particularly, compounds of the below-mentioned general formulae (1) and/or (2) are favorably used besides the above-exemplified antioxidants in the present invention, because the deterioration of the vinylpyrrolidone polymer is, for example, considered to occur due to participation of radical species that form by cleavage of peroxides that are generated by influence of ultraviolet rays and so on, but because the radical scavengers of the below-mentioned general formulae (1) and/or (2) make resonant structures in a radicalized state, and therefore have so high radical scavengeability as to be extremely excellent in the ability to prevent the polymer from deteriorating with the passage of time.

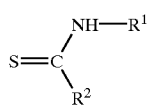

(1)

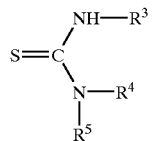

(2)

wherein each of $R^1$, $R^2$, $R^3$, $R^4$, and $R^5$ is, independently of each other, at least one member selected from the group consisting of a hydrogen atom, alkyl groups, substituted alkyl groups, aryl groups, and substituted aryl groups, wherein $R^1$ and $R^2$, or $R^3$ and $R^4$, may be bonded to each other to form a cyclic structure.

Specific examples of the compound of general formula (1) above include thioformamide, thioacetamide, thiopropionamide, N-methylthioformamide, N-methylthioacetamide, and N-ethylthioformamide, and specific examples of the compound of general formula (2) above include thiourea, N,N'-dimethylthiourea, N,N'-diethylthiourea, N,N'-dibutylthiourea, N,N'-diphenylthiourea, ethylenethiourea, and propylenethiourea, but there is no limitation thereto. Among them, particularly, cases where $R^4$ and/or $R^5$ in formula (2) is a hydrogen atom, in other words, cases where the compound of this formula is thiourea or a derivative therefrom, are preferable because, in such cases, the compound can make four kinds of resonant stabilized structures in a radicalized state and therefore has the highest radical scavengeability. When these compounds of general formulae (1) and/or (2) are used, the amount thereof is preferably in the range of 0.00001 to 10 weight %, more preferably 0.005 to 1 weight %, of the vinylpyrrolidone polymer.

In the present invention, moreover, it is preferable that the radical scavenger is jointly used with a peroxide decomposer. The joint use of the radical scavenger with the peroxide decomposer makes synergistic effects upon the prevention of the deterioration of the vinylpyrrolidone polymer, and therefore can maintain the effects for a longer time or at higher temperature than cases where they are used alone respectively.

The above peroxide decomposer reduces either undecomposed residue of peroxides as used for producing the vinylpyrrolidone polymer, or peroxides which form due to factors such as oxidation of radical species while the vinylpyrrolidone polymer is, for example, preserved or transported. Specific examples of the peroxide decomposer include those which are previously enumerated as the specific examples of the sulfur- or phosphorus-containing antioxidant among the above-exemplified antioxidants. When these peroxide decomposers are used, the amount thereof is preferably in the range of 0.00001 to 10 weight %, more preferably 0.005 to 1 weight %, of the vinylpyrrolidone polymer.

The aforementioned radical scavenger scavenges radicals, which are generated by influence of light, heat, and so on while the vinylpyrrolidone polymer is, for example, preserved or transported, with the result that the radicals are prevented from being chained to frameworks of the polymer. Specific examples of the radical scavenger include, among the above-exemplified antioxidants, those which are previously enumerated as the specific examples of the phenolic antioxidant, the bisphenolic antioxidant, the high-molecular phenolic antioxidant, the alcoholic antioxidant, the amine antioxidant, and the hindered-amine antioxidant, and further, those which are previously enumerated as the specific examples of the compound of general formula (1)

and/or (2). In the present invention, among these, particularly, the phenolic antioxidants, the bisphenolic antioxidants, the amine antioxidants, the hindered-amine antioxidants, and thiourea and derivatives therefrom are preferable, and thiourea and derivatives therefrom are more preferable. When these radical scavengers are used, the amount thereof is preferably in the range of 0.00001 to 10 weight %, more preferably 0.005 to 1 weight %, of the vinylpyrrolidone polymer.

In the present invention, it is preferable that the vinylpyrrolidone polymer further contains a radical formation inhibitor, because mixing of this radical formation inhibitor might make more synergistic effects upon the prevention of the deterioration of the vinylpyrrolidone polymer. Specific examples of the radical formation inhibitor include conventional ultraviolet absorbent, metal-deactivating agents, and quenchers. When these radical formation inhibitors are used, the amount thereof is preferably in the range of 0.00001 to 10 weight % of the vinylpyrrolidone polymer.

In the present invention, the method for mixing the vinylpyrrolidone polymer with the antioxidant (including the radical scavenger and the peroxide decomposer) and further, as the need arises, with the radical formation inhibitor is not especially limited, but, in a preferable method, these additives are added to a reaction liquid resultant from the polymerization reaction, or to a solution or dispersion of the vinylpyrrolidone polymer which is obtained by dissolving or dispersing a powder of the vinylpyrrolidone polymer into a solvent.

When the vinylpyrrolidone polymer according to the present invention is formed into an aqueous solution with a concentration of 5 weight %, its pH is preferably in the range of 4 to 12, more preferably 5 to 9. In these pH regions, the stabilization effect due to the antioxidant in the present invention can be exhibited still more effectively. In the case where pH is on the more acidic side than 4, the oxidation deterioration easily occurs, therefore the durability of the aforementioned stabilization effect tends to be damaged.

According to the present invention, the storage stability of the vinylpyrrolidone polymer can surely be judged by the following process. The vinylpyrrolidone polymer or a composition, which is prepared by mixing the vinylpyrrolidone polymer with a storage-stabilizing agent such as antioxidant, is subjected to a forcible test in which the vinylpyrrolidone polymer or the composition is kept heated at 120° C. under normal pressure in air for 2 hours. Before and after this forcible test, the vinylpyrrolidone polymer is dissolved into any solvent, in which the vinylpyrrolidone polymer is soluble, in a concentration of not higher than 10 weight %. The respective viscosities of the resultant solutions are measured at 25° C. with a capillary viscometer. Respective K values are determined from the resultant measured values, wherein the K values are defined by Fikentscher's equation. Incidentally, in the case where the judgment of the storage stability of the vinylpyrrolidone polymer is carried out in a solution state, the vinylpyrrolidone polymer is subjected to a promotion test in which the vinylpyrrolidone polymer is kept heated at 50° C. in a solution state for 14 days, and then the solution is diluted with any solvent to decrease the content of the vinylpyrrolidone polymer to not higher than 10 weight %, and then the viscosity of the resultant solution is measured to determine the K value. Then, either the reduction ratio of the K value after the forcible test to the initial value of the K value before the forcible test or the reduction ratio of the K value after the promotion test to the initial value of the K value before the promotion test is evaluated. As a result, the storage stability of the vinylpyrrolidone polymer can easily be judged. As to the vinylpyrrolidone polymer (including the composition as prepared by mixing the vinylpyrrolidone polymer with a storage-stabilizing agent such as antioxidant) which has excellent storage stability, the above reduction ratio is suppressed within 5%.

Herein, the K value is a value which is calculated from the measured viscosity and the following Fikentscher's equation:

$$(\log \eta_{rel})/C = [(75K_0^2)/(1+1.5K_0C)] + K_0$$

$$K = 1000K_0$$

wherein: C denotes the grams of the vinylpyrrolidone polymer in 100 ml of solution; and $\eta_{rel}$ denotes the viscosity of the solution to the solvent.

As to the storage-stabilized vinylpyrrolidone polymer according to the present invention (i.e. the vinylpyrrolidone polymer which is adjusted such that the reduction ratio of the K value defined by Fikentscher's equation will be within 5% when the vinylpyrrolidone polymer is subjected to a forcible test in which the vinylpyrrolidone polymer is kept heated at 120° C. under normal pressure in air for 2 hours or to a promotion test in which the vinylpyrrolidone polymer is kept heated at 50° C. in a solution state for 14 days), its storage stabilization process by other than mixing with the aforementioned antioxidant is also adoptable providing that it involves mixing with the storage-stabilizing agent or storage stabilization process by which the above reduction ratio of the K value can be maintained.

In the present invention, as the need arises, the vinylpyrrolidone polymer may be allowed to contain, for example, various additives such as processing stabilizers, plasticizers, dispersants, fillers, aging inhibitors, pigments, and curing agents.

In the preservation process of the present invention, it is important to suppress the oxygen concentration to not higher than 50,000 ppm in a gas phase that contacts with the vinylpyrrolidone polymer. The oxygen concentration is preferably suppressed to not higher than 10,000 ppm, more preferably not higher than 1,000 ppm. The lower the oxygen concentration is, the more effectively the preservation stability of the vinylpyrrolidone polymer can be enhanced. In the case where the oxygen concentration is higher than 50,000 ppm, the physical properties such as molecular weight (K value) of the vinylpyrrolidone polymer change with the passage of time when the vinylpyrrolidone polymer is preserved for a long time or at high temperature. When applying the preservation process of the present invention, product form of the vinylpyrrolidone polymer is not especially limited, but may be any form, for example, lumps, fibers, powders, solutions, films.

Herein, the gas phase is a portion other than a solid phase portion and/or a liquid phase portion as occupied by the vinylpyrrolidone polymer. The oxygen concentration in the gas phase means the absolute amount of oxygen as contained in a gas phase of a unit volume. In the case where the vinylpyrrolidone polymer is put in an airtight container, the oxygen concentration in the gas phase is a ratio of a volume as occupied by oxygen of the gas phase portion in the container under normal pressure to a volume of the gas phase portion. Incidentally, the oxygen concentration, for example, can easily be measured with commercially available oxygen analyzers such as galvanic cell diffusion types or zirconia sensor types.

A preferable example of a first means for suppressing the oxygen concentration in a gas phase that contacts with the vinylpyrrolidone polymer is a process comprising the steps of putting the vinylpyrrolidone polymer into an airtight container and evacuating the container in the preservation process of the present invention.

The specific method for evacuating the container is not especially limited, and the container may be evacuated in conventional manners. In addition, the vacuum degree is not especially limited, either, but it is preferable to achieve the vacuum such that the container may not be broken.

A preferable example of a second means for suppressing the oxygen concentration in a gas phase that contacts with the vinylpyrrolidone polymer is a process comprising the steps of putting the vinylpyrrolidone polymer into an airtight container and displacing air in the container with an inert gas and/or carbonic acid gas in the preservation process of the present invention. Particularly, it is more preferable that the displacement of air in the container (in which the vinylpyrrolidone polymer is put) is carried out with carbonic acid gas, because the preservation stability of the vinylpyrrolidone polymer is enhanced, and because the content of unreacted vinylpyrrolidone remaining in the vinylpyrrolidone polymer can be reduced by hydrolysis during the preservation. Incidentally, it is preferable that the displacement with an inert gas and/or carbonic acid gas is carried out not only after the vinylpyrrolidone polymer has been put into the container, but also in the step of transferring the vinylpyrrolidone polymer from a reservoir therefor to the airtight container. For example, it is preferable to keep conditions such as the reservoir or a transferring line in a state filled with the aforementioned gas.

The aforementioned inert gas is a gas that is poor in the reactivity, and specific examples thereof include: gases on group 0 in the periodic table, such as helium, neon, and argon; and nitrogen gas. Among these, nitrogen gas is preferable because it is easily available.

The specific method to displace air in the container with an inert gas and/or carbonic acid gas is not especially limited, but it is preferable that the volume of the gas, as introduced into the container in the displacement step with the gas, is at least 5 times as large as the capacity of the container. In addition, it is preferable that the introduction of the gas into the container is carried out after removing air by once evacuating the container, because the displacement with the gas can thereby more efficiently be carried out. Furthermore, in the case where the vinylpyrrolidone polymer is a solution, it is preferable to allow the solution to bubble by using a tool, such as a gas-introducing tube, in order to also remove oxygen as dissolved in the solution.

A preferable example of a third means for suppressing the oxygen concentration in a gas phase that contacts with the vinylpyrrolidone polymer is a process comprising the steps of putting the vinylpyrrolidone polymer into an airtight container and enclosing at least one deoxidizing agent together with the vinylpyrrolidone polymer in the container in the preservation process of the present invention.

The deoxidizing agent is not especially limited if it can remove oxygen by a chemical reaction. However, in view of the safety or the easy use, for example, those which are obtained by sealing an inorganic deoxidizing agent such as an iron powder, iron oxide, iron hydroxide, or an organic deoxidizing agent such as L-ascorbic acid, or any mixture thereof in with gas-permeable films are preferable. A moisture keeping agent to facilitate deoxidizing can be sealed together. Specifically, commercially available deoxidizing agents, such as "Ageless" made by Mitsubishi Gas Chemical Co., Inc., "Bitaron" made by Toagosei Co., Ltd., and "Modulan" made by Nippon Kayaku Co., Ltd., may be used.

In the aforementioned respective means for suppressing the oxygen concentration, the container to put the vinylpyrrolidone polymer into is not especially limited by the material or shape of the container if it can achieve the airtightness. However, containers which are so high airtight as to involve little gas absorption or leakage are preferable. Specifically, examples of the material of the container include glass, metals, and various plastics, and examples of the shape of the container include bottles, cans, and bags.

In the preservation process of the present invention, the first, second, and third means, which are aforementioned as the process for suppressing the oxygen concentration in a gas phase that contacts with the vinylpyrrolidone polymer, are used alone respectively or, preferably, in combinations with each other, whereby the oxygen concentration can effectively be suppressed.

It is preferable that the preservation process according to the present invention is applied also to the steps ranging from after the production of the vinylpyrrolidone polymer to the transfer of the vinylpyrrolidone polymer into a preservation container. For example, it is preferable to suppress the oxygen concentration to not higher than the aforementioned certain concentration in the gas phase in places such as reaction apparatuses, powdering apparatuses, drying apparatuses, reservoirs, and transferring lines just after the production.

The preservation stability of the vinylpyrrolidone polymer preserved by the preservation process of the present invention, for example, can be judged from the reduction ratio between K values before and after a forcible test as measured by the following process. The vinylpyrrolidone polymer, which is preserved in an airtight container, is subjected to a forcible test in which the vinylpyrrolidone polymer is kept heated together with the container at 120° C. for 2 hours. Before and after this forcible test, the vinylpyrrolidone polymer is dissolved into any solvent, in which the vinylpyrrolidone polymer is soluble, in a concentration of not higher than 10 weight %. The respective viscosities of the resultant solutions are measured at 25° C. with a capillary viscometer. Respective K values are determined from the resultant measured values, wherein the K values are defined by Fikentscher's equation. The reduction ratio of the K value after the forcible test to the initial value of the K value before the forcible test is evaluated. As a result, the preservation stability of the vinylpyrrolidone polymer can easily be judged. If the resultant reduction ratio is within 5%, the vinylpyrrolidone polymer can stably be preserved without any change of the physical properties even for a long time or at high temperature.

The initial value of the K value of the vinylpyrrolidone polymer, to which the present invention is applicable, is not especially limited, but the present invention is preferably applied to a vinylpyrrolidone polymer having a K value in the range of 15~150, preferably 15~120. In addition, because particularly the stability of a vinylpyrrolidone polymer having a high K value is inferior, the present invention is more preferably applied to a vinylpyrrolidone polymer having a K value in the range of 60~150, preferably 60~120.

The storage-stabilized vinylpyrrolidone polymer and preserved vinylpyrrolidone polymer according to the present invention are usable for vinylpyrrolidone-polymer-containing compositions that are used in various fields such as medicines, cosmetics, pressure sensitive adhesives or adhesives, paints, dispersants, inks, and electronic parts. In addition, such a vinylpyrrolidone polymer composition, according to the present invention, means not only a composition containing the present invention vinylpyrrolidone polymer which is beforehand mixed with the storage-stabilizing agent such as antioxidant or of which the K value is beforehand adjusted, but also a composition which is not beforehand mixed with the storage-stabilizing agent, but to which there is separately added a material (such as antioxidant) that contributes to the storage stabilization of the vinylpyrrolidone polymer as things turn out.

(Effects and Advantages of the Invention)

The present invention can provide a vinylpyrrolidone polymer, wherein the vinylpyrrolidone polymer has the K value that is prevented from reducing, therefore this vinylpyrrolidone polymer exhibits good heat resistance and storage stability.

The present invention can further provide a composition which contains the vinylpyrrolidone polymer and therefore exhibits good heat resistance and storage stability.

The present invention can further provide a stabilization process by which the heat resistance and the storage stability of the vinylpyrrolidone polymer are enhanced.

By the present invention, even when the vinylpyrrolidone polymer is preserved for a long time or at high temperature, the physical properties such as molecular weight (K value) of the vinylpyrrolidone polymer can be prevented from changing, therefore the vinylpyrrolidone polymer can stably be preserved. In addition, in the case where air in a container in which the vinylpyrrolidone polymer is put is displaced with carbonic acid gas, the content of vinylpyrrolidone which remains as a monomer in the vinylpyrrolidone polymer can be reduced by hydrolysis during the preservation.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

The K values in the examples and the comparative examples were calculated in the following way: the viscosity was measured by the aforementioned viscosity measurement process, that is, a process in which the relative viscosity of a 0.1~2 weight % aqueous solution of each vinylpyrrolidone polymer of the examples and the comparative examples was measured at 25° C. with a capillary viscometer; and the resultant measured viscosity was applied to Fikentscher's equation as aforementioned.

EXAMPLE 1

First, 10 g of poly(vinylpyrrolidone) (weight-average molecular weight=980,000; initial value of K value=86) and 0.1 g of sodium salicylate, as an antioxidant, were dissolved into 40 g of water. The resultant aqueous solution was cast onto a Teflon sheet, and then dried at 90° C. under a vacuum of 6,700 Pa (50 mmHg), and then pulverized, thus obtaining a poly(vinylpyrrolidone) powder. This powder was subjected to a forcible test in which the powder was heated at 120° C. under normal pressure in air for 2 hours. The resultant resin composition had a weight-average molecular weight of 970,000, and the K value of this composition was 82, therefore the reduction ratio of the K value was not higher than 5%.

Comparative Example 1

The procedure was carried out in the same way as of Example 1 except that no sodium salicylate was added. The resultant resin composition had a weight-average molecular weight of 650,000, and the K value reduced to 69 (reduction ratio=20%).

EXAMPLE 2

The procedure was carried out in the same way as of Example 1 except that: 10 g of poly(vinylpyrrolidone) (weight-average molecular weight=1,050,000; initial value of K value=91) and 0.05 g of sodium salicylate, as an antioxidant, were dissolved into 40 g of water, and then, to the resultant aqueous solution, 0.1 g of 2,2'-azobis(2-methylpropionamidine)dihydrochloride was added. The resultant resin composition had a weight-average molecular weight of 1,050,000, and the K value of this composition was 91, therefore there was no change of the K value from its initial value.

Comparative Example 2

The procedure was carried out in the same way as of Example 2 except that no sodium salicylate was added. The resultant resin composition had a weight-average molecular weight of 670,000, and the K value reduced to 69 (reduction ratio=24%).

EXAMPLE 3

The procedure was carried out in the same way as of Example 1 except that sodium salicylate was replaced with potassium salt of methylbenzotriazole. The resultant resin composition had a weight-average molecular weight of 960,000, and the K value of this composition was 83, therefore the reduction ratio of the K value was not higher than 5%

EXAMPLE 4

The procedure was carried out in the same way as of Example 1 except that sodium salicylate was replaced with 0.01 g of hydroquinone. The resultant resin composition had a weight-average molecular weight of 970,000, and the K value of this composition was 85, therefore the reduction ratio of the K value was not higher than 5%.

EXAMPLE 5

First, 10 g of poly(vinylpyrrolidone) (weight-average molecular weight=850,000; initial value of K value=80) and 0.1 g of 2,6-di-t-butyl-4-methylphenol, as an antioxidant, were dissolved into 40 g of methanol. The resultant solution was cast onto a Teflon sheet, and then dried at 70° C. under a vacuum of 6,700 Pa (50 mmHg), and then pulverized, thus obtaining a poly(vinylpyrrolidone) powder. The resultant poly(vinylpyrrolidone) powder was subjected to the same forcible test as of Example 1. The resultant resin composition had a weight-average molecular weight of 830,000, and the K value of this composition was 79, therefore the reduction ratio of the K value was not higher than 5%.

EXAMPLE 6

The procedure was carried out in the same way as of Example 5 except that 2,6-di-t-butyl-4-methylphenol was replaced with 2-mercaptobenzimidazole. The resultant resin composition had a weight-average molecular weight of 820,000, and the K value of this composition was 78, therefore the reduction ratio of the K value was not higher than 5%.

EXAMPLE 7

The procedure was carried out in the same way as of Example 5 except that 2,6-di-t-butyl-4-methylphenol was replaced with triphenyl phosphite. The resultant resin composition had a weight-average molecular weight of 800,000, and the K value of this composition was 76, therefore the reduction ratio of the K value was not higher than 5%.

EXAMPLE 8

First, 10 g of a copolymer of vinylpyrrolidone/vinyl acetate=80/20 (molar ratio) (weight-average molecular weight=610,000; initial value of K value=50) and 0.01 g of hydroquinone, as an antioxidant, were dissolved into 40 g of water. The resultant aqueous solution was cast onto a Teflon sheet, and then dried at 90° C. under a vacuum of 6,700 Pa (50 mmHg), and then pulverized, thus obtaining a vinylpyrrolidone/vinyl acetate copolymer powder. The resultant vinylpyrrolidone/vinyl acetate copolymer powder was subjected to the same forcible test as of Example 1. The resultant resin composition had a weight-average molecular weight of 590,000, and the K value of this composition was 49, therefore the reduction ratio of the K value was not higher than 5%.

Comparative Example 3

The procedure was carried out in the same way as of Example 8 except that no hydroquinone was added. The resultant resin composition had a weight-average molecular weight of 500,000, and the K value reduced to 42 (reduction ratio=16%).

EXAMPLE 9

The procedure was carried out in the same way as of Example 4 except that the amount of hydroquinone was changed to 0.0005 g. The resultant resin composition had a weight-average molecular weight of 920,000, and the K value of this composition was 82, therefore the reduction ratio of the K value was not higher than 5%.

Comparative Example 4

The procedure was carried out in the same way as of Example 4 except that the amount of hydroquinone was changed to 0.00003 g. The resultant resin composition had a weight-average molecular weight of 880,000, and the K value reduced to 88 (reduction ratio=7%).

EXAMPLE 10

The procedure was carried out in the same way as of Example 1 except that the amount of sodium salicylate was changed to 1.0 g. The resultant resin composition had a weight-average molecular weight of 980,000, and the K value of this composition was 85, therefore the reduction ratio of the K value was not higher than 5%.

EXAMPLE 11

The procedure was carried out in the same way as of Example 1 except that sodium salicylate was replaced with 0.01 g of thiourea. The resultant resin composition had a weight-average molecular weight of 970,000, and the K value of this composition was 85, therefore the reduction ratio of the K value was not higher than 5%.

EXAMPLE 12

First, 10 g of poly(vinylpyrrolidone), having a K value of 88, and 0.005 g of thiourea were dissolved into 40 g of water. The resultant aqueous solution was subjected to a promotion test in which the aqueous solution was heated at 50° C. for 14 days. As a result, the K value of the aqueous poly(vinylpyrrolidone) solution was 87 after the promotion test, therefore the reduction ratio of the K value was not higher than 5%.

Comparative Example 5

The procedure was carried out in the same way as of Example 12 except that no thiourea was used. As a result, the K value of the aqueous poly(vinylpyrrolidone) solution reduced to 74 by the promotion test (reduction ratio=16%).

EXAMPLE 13

First, 50 g of poly(vinylpyrrolidone) (initial value of K value=88) and 0.05 g of thiourea, as an antioxidant, were dissolved into 200 g of water. The resultant aqueous solution had a pH of 6.5. This aqueous solution was cast onto a Teflon sheet, and then dried at 90° C. under a vacuum of 6,700 Pa (50 mmHg), and then pulverized, thus obtaining a poly(vinylpyrrolidone) powder. This powder was kept at 50° C. in air, and the K value was measured every 7 days to evaluate the durability of the K value stability by the number of the days that had passed until the reduction ratio of the K value to its initial value increased to not lower than 5% (K value stability duration (days)). As a result, the K value stability duration was 70 days.

EXAMPLES 14 to 16

Each procedure was carried out in the same way as of Example 13 except that thiourea was replaced with each antioxidant as shown in Table 1. The K value stability duration (days) of each resultant poly(vinylpyrrolidone) powder is shown in Table 1.

EXAMPLES 17 to 25

First, 50 g of poly(vinylpyrrolidone) (initial value of K value=88) and 0.05 g of each antioxidant, as shown in Table 1, were dissolved into 200 g of methanol. The resultant solution was cast onto a Teflon sheet, and then dried at 70° C. under a vacuum of 6,700 Pa (50 mmHg), and then pulverized, thus obtaining each poly(vinylpyrrolidone) powder. The K value stability duration (days), as determined in the same way as of Example 13, of each resultant poly(vinylpyrrolidone) powder is shown in Table 1.

Comparative Example 6

The procedure was carried out in the same way as of Example 13 except that no antioxidant was used. The K value stability duration (days) of the resultant poly(vinylpyrrolldone) powder is shown in Table 1.

EXAMPLE 26

The procedure was carried out in the same way as of Example 13 except that 0.005 g of succinic acid was used to decrease the pH of the aqueous solution to 5.5. The K value stability duration (days) of the resultant poly(vinylpyrrolidone) powder is shown in Table 1.

EXAMPLE 27

The procedure was carried out in the same way as of Example 13 except that 0.005 g of sodium hydroxide was used to increase the pH of the aqueous solution to 11.6. The K value stability duration (days) of the resultant poly(vinylpyrrolidone) powder is shown in Table 1.

Comparative Example 7

The procedure was carried out in the same way as of Example 13 except that 0.01 g of succinic acid was used to decrease the pH of the aqueous solution to 3.5. The K value stability duration (days) of the resultant poly(vinylpyrrolidone) powder is shown in Table 1.

TABLE 1

|  | Antioxidant | K value stability duration (days) |
|---|---|---|
| Example 13 | Thiourea | 70 |
| Example 14 | Dimethylthiourea | 56 |
| Example 15 | Thioacetamide | 49 |
| Example 16 | Hydroquinone | 56 |
| Example 17 | 4-Benzoyloxy-2,2,6,6-tetramethyl-piperidine | 49 |
| Example 18 | N,N'-di-sec-butylphenylenediamine | 42 |
| Example 19 | 2-Mercaptobenzimidazole | 42 |
| Example 20 | Triphenyl phosphite | 35 |
| Example 21 | Thiourea 2-Mercaptobenzimidazole | 196 |
| Example 22 | Thioacetamide 2-Mercaptobenzimidazole | 175 |
| Example 23 | 4-Benzoyloxy-2,2,6,6-tetramethyl-piperidine 2-Mercaptobenzimidazole | 175 |
| Example 24 | N,N'-di-sec-butylphenylenediamine Triphenyl phosphite | 119 |
| Example 25 | Hydroquinone Triphenyl phosphite | 168 |
| Example 26 | Thiourea Succinic acid (pH 5.5) | 56 |
| Example 27 | Thiourea Sodium hydroxide (pH 11.6) | 70 |
| Comparative Example 6 | — | 14 |
| Comparative Example 7 | Thiourea Succinic acid (pH 3.5) | 21 |

EXAMPLE 28

First, 100 g of powdery poly(vinylpyrrolidone) having a K value of 91 was put into a glass container of 500 ml in capacity with an airtightenable lid and an oxygen sensor, and the glass container was then set in a glove box. Then, nitrogen gas was introduced into the glove box for about 30 minutes to suppress the oxygen concentration in the glove box to 20 ppm, and the glass container was then airtightened to enclose the powder of poly(vinylpyrrolidone) with nitrogen gas.

This poly(vinylpyrrolidone) was heated together with the container by an oven of 120° C. for 2 hours, and then cooled to room temperature. The K value of the poly(vinylpyrrolidone) was 91 after the heating treatment, therefore it was confirmed that the K value had not changed.

EXAMPLE 29

First, 300 g of 20% aqueous solution of poly(vinylpyrrolidone) having a K value of 91 was put into a glass container of 500 ml in capacity with an airtightenable lid and an oxygen sensor, and the glass container was then set in a glove box. Then, nitrogen gas was introduced into the glove box for about 30 minutes to suppress the oxygen concentration in the glove box to 20 ppm, and simultaneously, the solution in the container was allowed to bubble with nitrogen gas at a flow rate of 100 ml/minute for 30 minutes by using a nitrogen-gas-introducing tube having a gas filter on the tip. Thereafter, the glass container was then airtightened to enclose the aqueous poly(vinylpyrrolidone) solution with nitrogen gas.

This poly(vinylpyrrolidone) was subjected to the same heating treatment as of Example 28. As a result, the K value of the poly(vinylpyrrolidone) was 91 after the heating treatment, therefore it was confirmed that the K value had not changed.

EXAMPLE 30

First, 300 g of 20% aqueous solution of poly(vinylpyrrolidone) having a K value of 87 (containing vinylpyrrolidone in a ratio of 50 ppm) was put into a glass container of 500 ml in capacity with an airtightenable lid and an oxygen sensor, and the glass container was then set in a glove box. Then, carbonic acid gas was introduced into the glove box for about 30 minutes to suppress the oxygen concentration in the glove box to 20 ppm, and simultaneously, the solution in the container was allowed to bubble with carbonic acid gas at a flow rate of 50 ml/minute for 30 minutes by using a carbonic-acid-gas-introducing tube having a gas filter on the tip. Thereafter, the glass container was then airtightened to enclose the aqueous poly(vinylpyrrolidone) solution with carbonic acid gas. Incidentally, pH of the solution was 3.9 after the carbonic acid gas bubbling.

This poly(vinylpyrrolidone) was subjected to the same heating treatment as of Example 28. As a result, the K value of the poly(vinylpyrrolidone) was 86 after the heating treatment, therefore it was confirmed that the K value had changed little (reduction ratio=1.1%.

In addition, the above poly(vinylpyrrolidone) was preserved at 25° C. for 1 month in the state enclosed with carbonic acid gas, and then sampled in the glove box to quantify vinylpyrrolidone in the solution by liquid chromatography. As a result, it was confirmed that the vinylpyrrolidone content had reduced to not higher than 1 ppm.

EXAMPLE 31

First, 20 g of powdery poly(vinylpyrrolidone) having a K value of 89 was put into a heat-sealable PET bag. Then, an oxygen sensor and a glass tube having a gas filter on the tip were introduced into the bag, and the other portions of the bag were airtightened by heat-sealing. Then, the glass tube was connected to a vacuum system of 50 mmHg to suck air out of the bag. After 15 minutes, the glass tube was disconnected from the vacuum system and then quickly sealed tightly to enclose the poly(vinylpyrrolidone) powder in a vacuum state. At that time, the oxygen concentration in the bag was 180 ppm.

This poly(vinylpyrrolidone) was subjected to the same heating treatment as of Example 28 together with the bag. As a result, the K value of the poly(vinylpyrrolidone) was 88 after the heating treatment, therefore it was confirmed that the K value had changed little (reduction ratio=1.1%).

EXAMPLE 32

First, 20 g of powdery poly(vinylpyrrolidone) having a K value of 91 was put into a glass container of 100 ml in capacity with an airtightenable lid and an oxygen sensor. Then, "Ageless SA" made by Mitsubishi Gas Chemical Co., Inc. was fixed onto the back side of the lid, and then the container was airtightened by closing the lid and left in this state for 24 hours. After this leaving, the oxygen concentration in the container was 700 ppm.

This poly(vinylpyrrolidone) was subjected to the same heating treatment as of Example 28 together with the container. As a result, the K value of the poly(vinylpyrrolidone) was 89 after the heating treatment, therefore it was confirmed that the K value had changed little (reduction ratio=2.2%).

EXAMPLE 33

A poly(vinylpyrrolidone) powder was enclosed with nitrogen gas in the same way as of Example 28 except that the powdery poly(vinylpyrrolidone) was replaced with a powdery vinylpyrrolidone/vinyl acetate copolymer (weight ratio of copolymerization=80/20) having a K value of 70.

This poly(vinylpyrrolidone) was subjected to the same heating treatment as of Example 28 together with the container. As a result, the K value of the poly(vinylpyrrolidone) was 70 after the heating treatment, therefore it was confirmed that the K value had not changed.

Comparative Example 8

The glass container, in which the powdery poly(vinylpyrrolidone) having a K value of 91 was put, was set into a glove box in the same way as of Example 28 and then airtightened without the introduction of nitrogen gas into the glove box. At that time, the oxygen concentration in the glove box was 20.95%.

This poly(vinylpyrrolidone) was subjected to the same heating treatment as of Example 28. As a result, the K value of the Apoly(vinylpyrrolidone) reduced to 84 (reduction ratio=7.7%).

Comparative Example 9

The glass container, in which the powdery poly(vinylpyrrolidone) having a K value of 91 was put, was set into a glove box in the same way as of Example 28. Then, a mixed gas of nitrogen gas and air was introduced into the glove box for about 30 minutes to suppress the oxygen concentration in the glove box to 8%, and the glass container was then airtightened to enclose the powder of poly(vinylpyrrolidone) with the above mixed gas.

This poly(vinylpyrrolidone) was subjected to the same heating treatment as of Example 28. As a result, the K value of the poly(vinylpyrrolidone) reduced to 85 (reduction ratio=6.6%).

Comparative Example 10

The glass container, in which the 20% aqueous solution of poly(vinylpyrrolidone) having a K value of 91 was put, was set into a glove box in the same way as of Example 29 and then airtightened without the introduction of nitrogen gas into the glove box. At that time, the oxygen concentration in the glove box was 20.95%.

This poly(vinylpyrrolidone) was subjected to the same heating treatment as of Example 29. As a result, the K value of the poly(vinylpyrrolidone) reduced to 85 (reduction ratio=6.6%).

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A vinylpyrrolidone polymer, comprising at least one antioxidant in a ratio of 0.00001~30 weight % to the vinylpyrrolidone polymer and wherein said vinylpyrrolidone polymer comprises not less than 20.0 mol % of vinylpyrrolidone as a monomer component.

2. A vinylpyrrolidone polymer according to claim 1, wherein the antioxidant is a compound having a phenolic hydroxyl group.

3. A vinylpyrrolidone polymer according to claim 1, wherein the antioxidant is a compound of general formula (1) and/or (2) below:

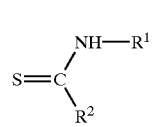

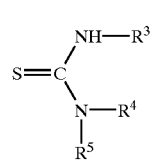

wherein each of $R^1$, $R^2$, $R^3$, $R^4$, and $R^5$ is, independently of each other, at least one member selected from the group consisting of a hydrogen atom, alkyl groups, substituted alkyl groups, aryl groups, and substituted aryl groups, wherein $R^1$ and $R^2$, or $R^3$ and $R^4$, may be bonded to each other to form a cyclic structure.

4. A vinylpyrrolidone polymer according to claim 1, wherein the antioxidant comprises the joint use of a radical scavenger with a peroxide decomposer.

5. A vinylpyrrolidone polymer according to claim 1, which further contains a radical formation inhibitor.

6. A vinylpyrrolidone polymer, which is adjusted such that the reduction ratio of the K value defined by Fikentscher's equation will be within 5% when the vinylpyrrolidone polymer is subjected to a forcible test in which the vinylpyrrolidone polymer is kept heated at 120° C. under normal pressure in air for 2 hours.

7. A vinylpyrrolidone polymer, which is adjusted such that the reduction ratio of the K value defined by Fikentscher's equation will be within 5% when the vinylpyrrolidone polymer is subjected to a promotion test in which the vinylpyrrolidone polymer is kept heated at 50° C. in a solution state for 14 days.

8. A vinylpyrrolidone polymer according to claim 1, wherein an aqueous solution having a vinylpyrrolidone polymer concentration of 5 weight % has a pH in the range of 4 to 12.

9. A vinylpyrrolidone polymer according to claim 3, wherein an aqueous solution having a vinylpyrrolidone concentration of 5 weight % has a pH in the range of 4 to 12.

10. A resin composition, which comprises a vinylpyrrolidone polymer as a resin component, and further comprises at least one antioxidant in a ratio of 0.00001~30 weight % to the vinylpyrrolidone polymer, said vinylpyrrolidone polymer comprising not less than 20.0 mol % of vinylpyrrolidone based on the entire monomer components of said vinylpyrrolidone polymer.

11. A stabilization process for a vinylpyrrolidone polymer, which comprises the step of mixing the vinylpyrrolidone polymer with at least one antioxidant in a ratio of 0.00001~30 weight % to the vinylpyrrolidone polymer, said vinylpyrrolidone polymer comprising not less than 20.0 mol % of vinylpyrrolidone based on the entire monomer components of said vinylpyrrolidone polymer.

12. A vinylpyrrolidone polymer according to claim 6, wherein said vinylpyrrolidone polymer comprises not less than 20 mol % of vinylpyrrolidone as a monomer component based on the entire monomer content of said vinylpyrrolidone polymer.

13. A vinylpyrrolidone polymer according to claim 12, wherein said vinylpyrrolidone polymer comprises an antioxidant dispersed in said vinylpyrrolidone polymer in the amount of 0.00001 wt % to 30 wt % based on the weight of said vinylpyrrolidone polymer.

14. A vinylpyrrolidone polymer according to claim 7, wherein said vinylpyrrolidone polymer comprises not less than 20 mol % of vinylpyrrolidone as a monomer component based on the entire monomer content of said vinylpyrrolidone polymer.

15. A vinylpyrrolidone polymer according to claim 14, wherein said vinylpyrrolidone polymer comprises an antioxidant dispersed in said vinylpyrrolidone polymer in the amount of 0.00001 wt % to 30 wt % based on the weight of said vinylpyrrolidone polymer.

* * * * *